US011023370B2

(12) United States Patent
Takeuchi

(10) Patent No.: US 11,023,370 B2
(45) Date of Patent: Jun. 1, 2021

(54) MEMORY SYSTEM HAVING A PLURALITY OF MEMORY CHIPS AND METHOD FOR CONTROLLING POWER SUPPLIED TO THE MEMORY CHIPS

(71) Applicant: Toshiba Memory Corporation, Tokyo (JP)

(72) Inventor: Ryo Takeuchi, Kawasaki Kanagawa (JP)

(73) Assignee: Toshiba Memory Corporation, Tokyo (JP)

(*) Notice: Subject to any disclaimer, the term of this patent is extended or adjusted under 35 U.S.C. 154(b) by 0 days.

(21) Appl. No.: 16/284,145

(22) Filed: Feb. 25, 2019

(65) Prior Publication Data

US 2020/0089604 A1 Mar. 19, 2020

(30) Foreign Application Priority Data

Sep. 19, 2018 (JP) .............................. JP2018-175428

(51) Int. Cl.
*G06F 12/02* (2006.01)
*G06F 3/06* (2006.01)
*G06F 1/3234* (2019.01)

(52) U.S. Cl.
CPC ........ *G06F 12/0246* (2013.01); *G06F 1/3275* (2013.01); *G06F 3/0625* (2013.01); *G06F 12/0253* (2013.01)

(58) Field of Classification Search
CPC .. G06F 12/0246; G06F 3/0625; G06F 1/3275; G06F 12/0253
See application file for complete search history.

(56) References Cited

U.S. PATENT DOCUMENTS

| 2003/0145239 A1* | 7/2003 | Kever ................... G06F 1/3203 713/300 |
| 2007/0011421 A1* | 1/2007 | Keller, Jr. .............. G06F 1/3225 711/165 |
| 2008/0005516 A1* | 1/2008 | Meinschein .......... G06F 1/3225 711/165 |
| 2012/0317337 A1 | 12/2012 | Johar et al. |
| 2014/0244960 A1* | 8/2014 | Ise .......................... G06F 3/061 711/165 |

(Continued)

FOREIGN PATENT DOCUMENTS

| JP | 2014167700 A | 9/2014 |
| JP | 2014522537 A | 9/2014 |
| JP | 2018049523 A | 3/2018 |

*Primary Examiner* — Tasnima Matin
(74) *Attorney, Agent, or Firm* — Kim & Stewart LLP

(57) ABSTRACT

A memory system includes a non-volatile memory having a plurality of memory chips, a plurality of switches provided for each of the memory chips for switching on and off supply of power to the corresponding memory chip, and a memory controller configured to control the switches and data access to the non-volatile memory. The memory controller is further configured to determine whether there is a first memory chip among the plurality of memory chips that has no data item stored therein with an elapsed time from a most recent access thereof that is less than a threshold value, and if so, turn off the supply of power to the first memory chip while maintaining the supply of power to the plurality of memory chips other than the first memory chip.

11 Claims, 18 Drawing Sheets

(56) References Cited

U.S. PATENT DOCUMENTS

2015/0121024 A1* 4/2015 Kolvick ................ G06F 16/214
                                                        711/162
2015/0309737 A1* 10/2015 Kim ..................... G06F 3/0611
                                                        711/103
2017/0075595 A1* 3/2017 Maejima .................. G06F 1/32
2018/0088811 A1   3/2018 Kanno

* cited by examiner

FIG. 5

| IDENTIFICATION INFORMATION | | LAST ACCESS TIME | ELAPSED TIME (H) | HOST DATA FLAG | COLD DATA FLAG | EMPTY PAGE FLAG |
|---|---|---|---|---|---|---|
| NAND CHIP 21-1 | PAGE NUMBER 1 | y1/m1/d1 h1:m1:s1 | 3000 | | ○ | |
| | PAGE NUMBER 2 | y1/m2/d2 h2:m2:s2 | 600 | ○ | | |
| | PAGE NUMBER 3 | y1/m3/d3 h3:m3:s3 | 10 | ○ | | |
| | PAGE NUMBER 4 | y1/m4/d4 h4:m4:s4 | 100 | ○ | | |
| | PAGE NUMBER 5 | y1/m5/d5 h5:m5:s5 | 10000 | ○ | ○ | |
| | PAGE NUMBER 6 | y1/m6/d6 h6:m6:s6 | 800 | | | |
| | PAGE NUMBER 7 | y1/m7/d7 h7:m7:s7 | 2800 | | ○ | |
| | PAGE NUMBER 8 | y1/m8/d8 h8:m8:s8 | 5000 | | ○ | |
| | PAGE NUMBER 9 | y1/m9/d9 h9:m9:s9 | 4000 | | ○ | |
| | PAGE NUMBER 10 | | 0 | | | ○ |
| | PAGE NUMBER 11 | | 0 | | | ○ |
| | PAGE NUMBER 12 | | 0 | | | ○ |
| NAND CHIP 21-2 | PAGE NUMBER 1 | y1/m10/d13 h10:m10:s10 | 200 | ○ | | |
| | PAGE NUMBER 2 | y1/m11/d14 h11:m11:s11 | 800 | ○ | | |
| | PAGE NUMBER 3 | y1/m112/d15 h12:m12:s12 | 3300 | | ○ | |
| ... | | | | | | |

FIG. 6

| IDENTIFIATION INFORMATION | | COLD DATA FLAG | HOT DATA FLAG |
|---|---|---|---|
| NAND CHIP IDENTIFICATION INFORMATION | PAGE NUMBER | | |
| NAND CHIP 21-1 | PAGE NUMBER 1 | ○ | |
| NAND CHIP 21-2 | PAGE NUMBER 5 | ○ | |
| NAND CHIP 21-3 | PAGE NUMBER 7 | ○ | |
| NAND CHIP 21-4 | PAGE NUMBER 8 | | ○ |
| NAND CHIP 21-4 | PAGE NUMBER 9 | | ○ |
| NAND CHIP 21-2 | PAGE NUMBER 3 | ○ | |
| | ... | | |

FIG. 18

| FREQUENCY COMPARISON | POWER CONTROL |
|---|---|
| WHEN Q>R | OFF UNTIL COMMAND IS RECEIVED FROM HOST |
| WHEN Q=R | OFF UNTIL COMMAND IS RECEIVED FROM HOST or ON AT LOW FREQUENCY |
| WHEN Q<R | ON AT MEDIUM FREQUENCY (DETERMINED BY VALUE OF Q-R) or ON AT HIGH FREQUENCY (DETERMINED BY VALUE OF Q-R) |

FIG. 19

| WHEN Q>R | OFF UNTIL COMMAND IS RECEIVED FROM HOST |
|---|---|
| WHEN Q=R | ON AT LOW FREQUENCY |
| WHEN 0<R-Q<A | ON AT MEDIUM FREQUENCY |
| WHEN R-Q>A | ON AT HIGH FREQUENCY |

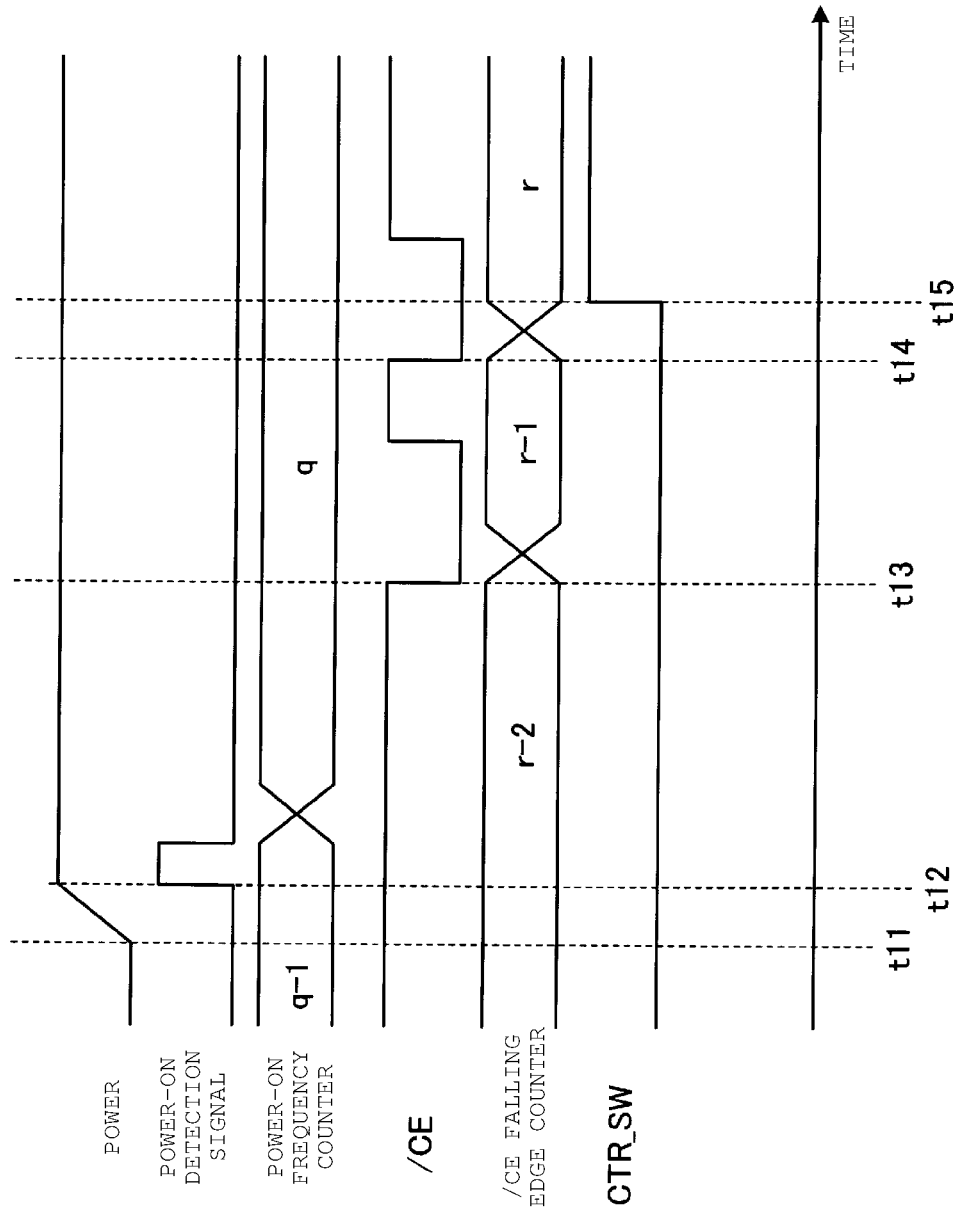

MEMORY SYSTEM HAVING A PLURALITY OF MEMORY CHIPS AND METHOD FOR CONTROLLING POWER SUPPLIED TO THE MEMORY CHIPS

CROSS-REFERENCE TO RELATED APPLICATION

This application is based upon and claims the benefit of priority from Japanese Patent Application No. 2018-175428, filed Sep. 19, 2018, the entire contents of which are incorporated herein by reference.

FIELD

Embodiments described herein relate generally to a memory system and a control method thereof.

BACKGROUND

In a memory system using a NAND flash memory (hereinafter referred to as a NAND memory) as a storage medium, garbage collection (compaction) for collecting valid data and erasing unnecessary data is performed in order to utilize the memory space without waste.

In the memory system, further reduction in power consumption is desired.

DESCRIPTION OF THE DRAWINGS

FIG. 5 is a diagram showing an example of access state information.

FIG. 6 is a diagram showing an example of movement target information.

FIG. 18 is a diagram showing an example of power control by comparing the frequency of power-on and the frequency of falling edges of the chip enable signal.

FIG. 19 is a diagram showing an example of power control that is set in a comparison circuit.

FIG. 20 is a timing chart showing an example of a processing by a switch control circuit.

DETAILED DESCRIPTION

Embodiments provide a memory system and a control method thereof, which are capable of reducing power consumption as compared with the related art.

In general, according to one embodiment, a memory system includes a non-volatile memory having a plurality of memory chips, a plurality of switches provided in each of the memory chips for switching on and off the power to the memory chips, and a memory controller configured to control the switches and data access to the non-volatile memory. The memory controller is further configured to determine whether there is a first memory chip among the plurality of memory chips that has no data item stored therein with an elapsed time from a most recent access thereof that is less than a threshold value, and if so, turn off the supply of power to the first memory chip while maintaining the supply of power to the plurality of memory chips other than the first memory chip.

Hereinafter, a memory system and a control method thereof according to an embodiment will be described in detail with reference to the accompanying drawings. It should be noted that the present disclosure is not limited by these embodiments.

First Embodiment

Figure 1:
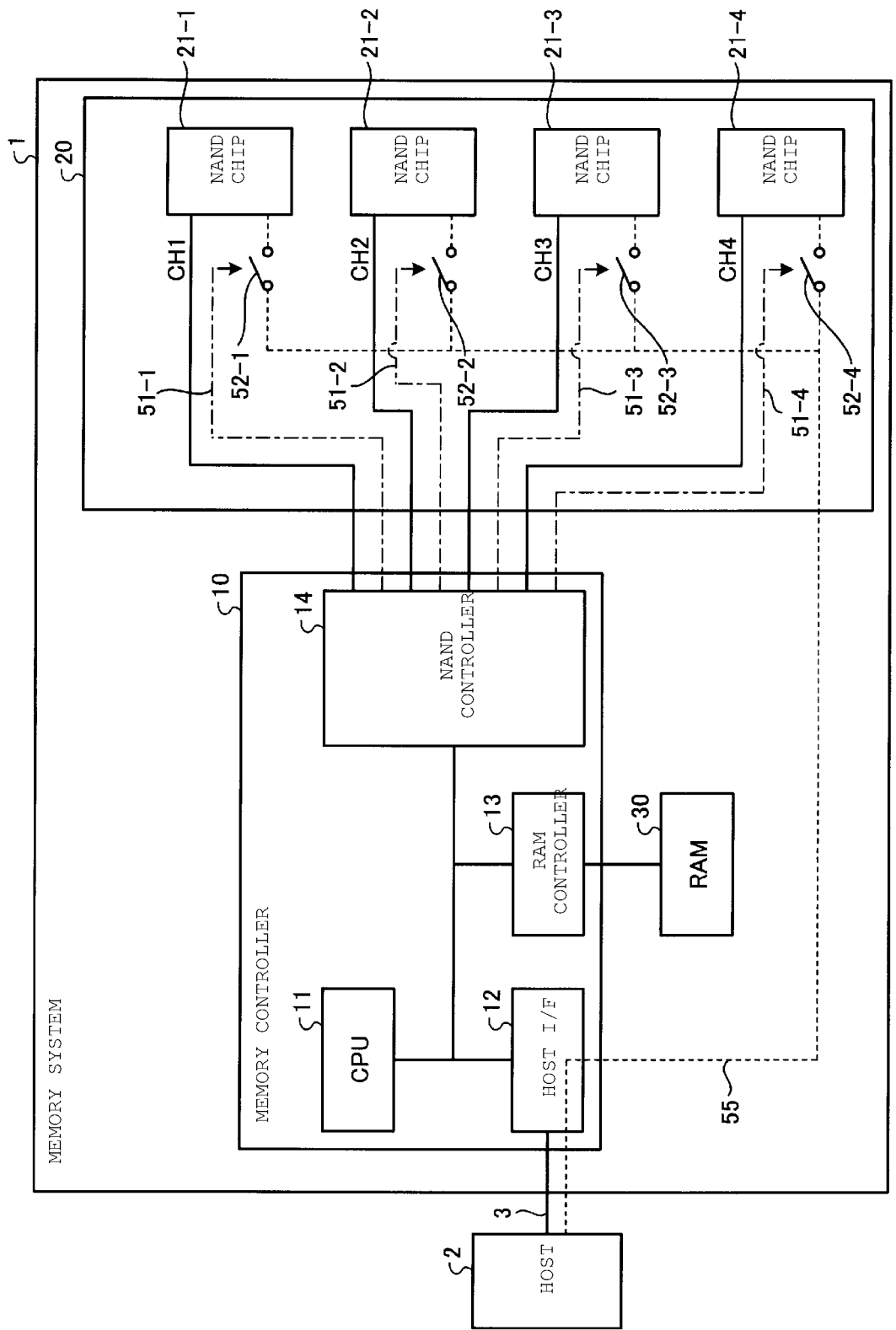
FIG. 1 is a diagram schematically showing an example of a configuration of a memory system according to a first embodiment.

FIG. 1 is a diagram schematically showing an example of a configuration of a memory system according to a first embodiment. The memory system 1 is connected to a host 2 through a communication path 3. The host 2 is a computing device, for example, a personal computer, a portable computer, or a portable communication device. The memory system 1 serves as an external storage device of the host 2. Any standard may be adopted as the interface standard of the communication path 3.

The memory system 1 includes a memory controller 10, and a NAND memory 20 and a random access memory (RAM) 30 used as storage media.

The NAND memory 20 includes two or more NAND memory chips (hereinafter referred to as NAND chips) 21. Here, the NAND memory 20 includes four NAND chips 21-1 to 21-4.

Figure 2:
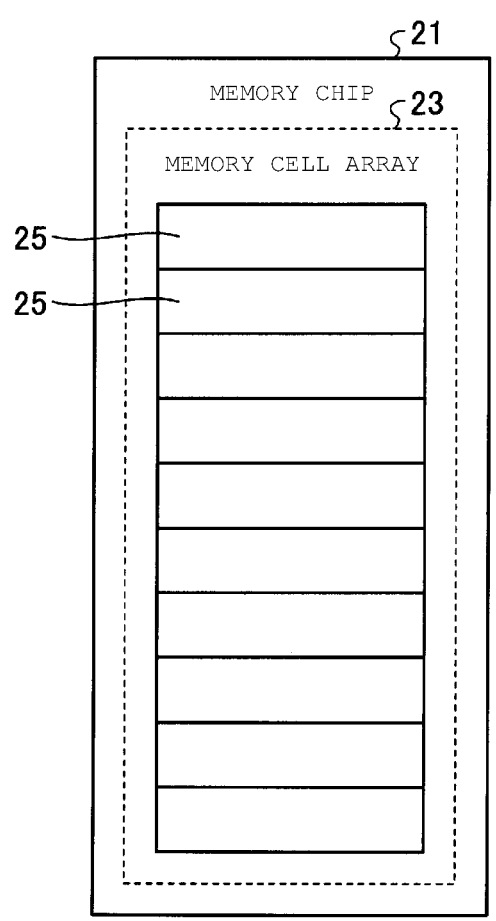
FIG. 2 is a diagram schematically showing an example of a configuration of each NAND chip.

FIG. 2 is a diagram schematically showing an example of a configuration of each NAND chip. Each of the NAND chips 21 includes a memory cell array 23, respectively. The memory cell array 23 is configured with a plurality of memory cells in a matrix. The memory cell array 23 includes a plurality of physical blocks 25. Each of the NAND chips 21 is provided with a peripheral circuit (not shown) (for example, a row decoder, a column decoder, a page buffer, a data cache, and the like).

Figure 3:
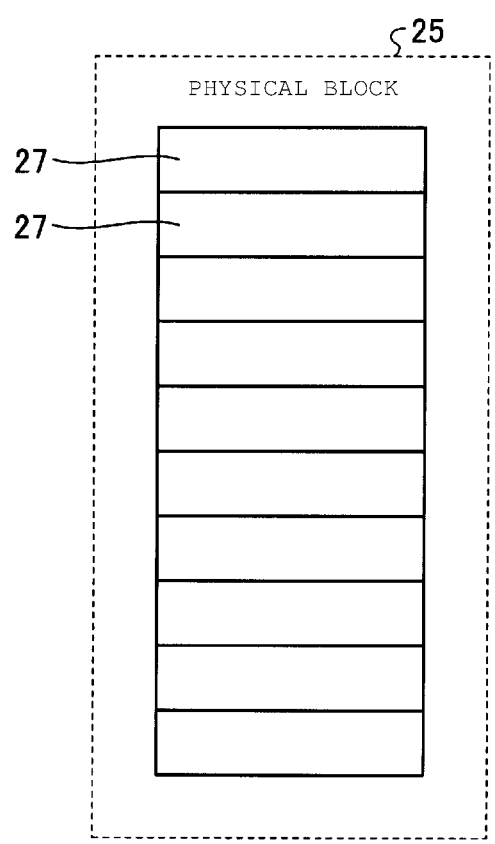
FIG. 3 is a diagram schematically showing an example of a configuration of each physical block.

The physical block 25 is a unit of erasing in the NAND chip 21. FIG. 3 is a diagram schematically showing an example of the configuration of each physical block. Each of the physical blocks 25 includes a plurality of physical pages 27. The physical page 27 is a unit of writing and reading in the NAND chip 21. Each of the physical pages 27 is identified by a page number, respectively.

Each of the four NAND chips 21-1 to 21-4 that make up the NAND memory 20 is connected to the memory controller 10 through any of the four channels CH1 to CH 4. As a result, the memory controller 10 can individually control each of the channels CH1 to CH4.

Each of the channels CH1 to CH 4 is configured with a wiring group including an I/O signal line and a control signal line. The control signal line includes a chip enable signal line, a chip select signal line, and the like. In addition, in the first embodiment, the control signal line includes switch control lines 51-1 to 51-4 for controlling switches 52-1 to 52-4 that switch on/off the supply of power to the NAND chips 21-1 to 21-4. The switch control lines 51-1 to 51-4 are individually shown separately from the other signal lines in FIG. 1. The switch control lines 51-1 to 51-4 are connected to the switches 52-1 to 52-4 provided in the respective NAND chips 21-1 to 21-4. The switch control lines 51-1 to 51-4 may also be configured with chip enable signal lines for switching the NAND chips 21-1 to 21-4 to a state able to accept commands and chip select signal lines for selecting the NAND chips 21-1 to 21-4.

A power line 55 connected to the host 2 through a host I/F 12 is connected to the four NAND chips 21-1 to 21-4. The power line 55 includes switches 52-1 to 52-4 for switching on/off the supply of power to the NAND chips 21-1 to 21-4, respectively. The switches 52-1 to 52-4 are load switches, for example. In addition, the switches 52-1 to 52-4 switch on/off in accordance with an instruction from the memory controller 10 through the switch control lines 51-1 to 51-4 described above. In the first embodiment, the switches 52-1 to 52-4 may be provided outside the NAND chips 21-1 to 21-4. Therefore, while FIG. 1 illustrates an example where the switches 52-1 to 52-4 are provided in the NAND memory 20, the switches may be provided outside the NAND memory 20, that is, between the memory controller 10 and the NAND memory 20.

The RAM 30 stores management information for the memory controller 10 to access the NAND memory 20. In addition, the RAM 30 is used by the memory controller 10 as a buffer for data transfer between the host 2 and the NAND memory 20. Further, the RAM 30 is also used as a buffer into which the firmware program is loaded.

The memory controller 10 controls the NAND memory to write data based on a write command (write request) from the host 2. In addition, the memory controller 10 controls the NAND memory 20 to read data based on a read command (read request) from the host 2. The memory controller 10 includes a Central Processing Unit (CPU) 11, a host interface (hereinafter referred to as a host I/F) 12, a RAM controller 13, and a NAND controller 14. The CPU 11, the host I/F 12, the RAM controller 13, and the NAND controller 14 are connected to each other by a bus.

The host I/F 12 performs controlling of the communication path 3. In addition, the host I/F 12 receives a command (request) from the host 2. Further, the host I/F 12 transfers data between the host 2 and the RAM 30. The RAM controller 13 controls the RAM 30. The NAND controller 14 performs data transfer between the RAM 30 and the NAND memory 20. The CPU 11 serves as a processing unit that performs overall control of the memory controller 10 based on the firmware program.

Figure 4:
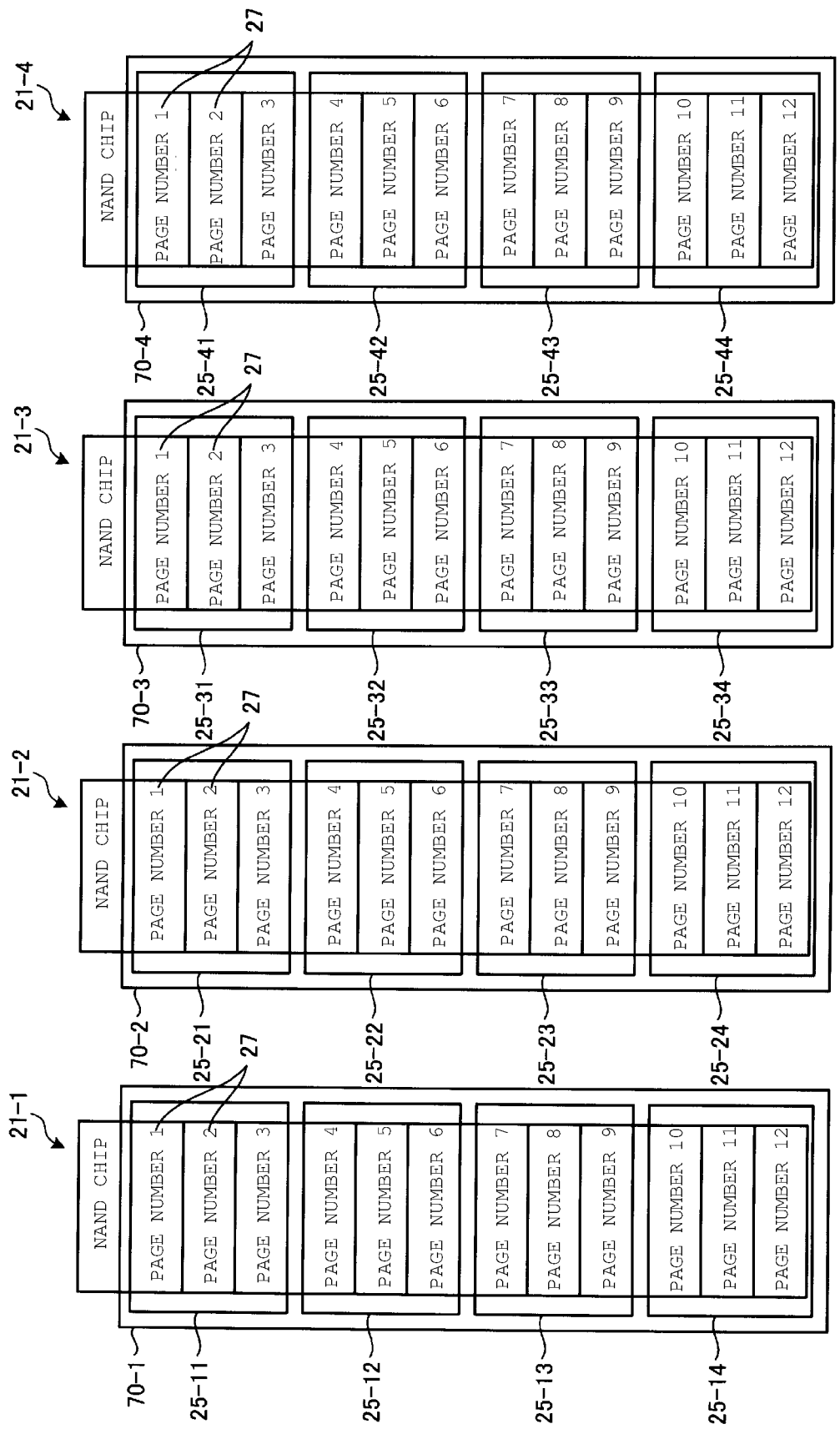
FIG. 4 is a diagram schematically showing a relationship between a physical block and a logical block according to the first embodiment.

The memory controller 10 collectively manages a plurality of physical blocks in one NAND chip 21 as a logical block. That is, in the present embodiment, the logical block is configured such that the logical block does not include the physical blocks 25 of different NAND chips 21. FIG. 4 is a diagram schematically showing a relationship between a physical block and a logical block according to the first embodiment. Here, for the sake of simplicity of explanation, it is assumed that each of the NAND chips 21-1 to 21-4 is configured with twelve physical pages 27. In addition, each of the physical pages 27 is identified by a page number. In FIG. 4, "PAGE NUMBER 1", "PAGE NUMBER 2", . . . , "PAGE NUMBER 12" are given to the physical pages 27 of the respective NAND chips 21-1 to 21-4.

In each of the NAND chips 21-1 to 21-4, the physical blocks 25-11, 25-21, 25-31, and 25-41 are configured with the physical pages 27 indicated by page numbers 1 to 3. Likewise, the physical blocks 25-12, 25-22, 25-32, and 25-42 are configured with the physical pages 27 indicated by page numbers 4 to 6, the physical blocks 25-13, 25-23, 25-33, and 25-43 are configured with the physical pages 27 indicated by page numbers 7 to 9, and the physical blocks 25-14, 25-24, 25-34, and 25-44 are configured with the physical pages 27 indicated by page numbers 10 to 12. Further, one logical block 70-1 to 70-4 is configured with four physical blocks in each of the NAND chips 21-1 to 21-4. For example, one logical block 70-1 is configured with four physical blocks 25-11 to 25-14 in the NAND chip 21-1. The same applies to the other NAND chips 21-2 to 21-4.

In the first embodiment, a NAND chip for storing cold data is preset, where "cold data" is data accessed less frequently from a plurality of NAND chips 21-1 to 21-4. As will be described below, the cold data present in the other NAND chips is collected into this NAND chip. Here, it is assumed that the NAND chip 21-4 is the NAND chip that stores the cold data. In addition, in the following description, the NAND chip 21-4 that stores the cold data is referred to as the 'NAND chip for storing cold data'. In the following description, unless otherwise specified, the NAND chips are referred to as the NAND chip 21.

In the first embodiment, the memory controller performs access state management process, data movement process, and power management process. In the access state management process, the memory controller 10 manages the access state for each management unit area of a management unit size of each NAND chip 21 as access state information. The management unit may be set as any size, such as physical page unit, physical block unit, logical block unit or NAND chip unit. The following description provides an example in which a management unit is based on the physical page unit.

More specifically, in the access state management process, the memory controller 10, periodically or before the power of the memory system 1 is turned off, updates an elapsed time from the time of last access to each physical page in the NAND memory 20. In addition, at this time, the memory controller 10 determines whether the data stored for each physical page is cold data using a threshold value, and when the data is cold data, the memory controller 10 registers identification information indicating the position of the physical page including the cold data in data movement target information that identifies the target of the data movement process. For example, a combination of the identification number of the NAND chip 21 and the page number of the physical page 27 may be used as the identification information.

FIG. 5 is a diagram showing an example of access state information. The access state information refers to information that records an elapsed time from the time of the last access request to each physical page 27 in the NAND memory 20. The access request is a read request, for example. In the example of FIG. 5, the access state information includes identification information, the time of last access to the page number identified by the identification information, and the elapsed time from the last access time. For example, a combination of the information on identification of the NAND chip 21 and the page number for identifying the physical page may be used as the identification information. In addition, the access state information may also include a hot data flag indicating hot data which is frequently accessed data, a cold data flag indicating cold data, and an empty page flag indicating an empty page. Any value may be set for the threshold value for determining whether the data is hot data or cold data. In FIG. 5, it is assumed that the threshold value for determining the cold data is 2,500 hours. Further, among the access state information, a set of one identification information, the last access time, the elapsed time, the hot data flag, the cold data flag, and the empty page flag is hereinafter referred to as a 'record'.

FIG. 6 is a diagram showing an example of movement target information. The movement target information refers to information for managing a movement target including data that is determined as cold data in the access state management process, or hot data that was previously cold data. The movement target information includes identification information indicating a position of a physical page that includes cold data to be moved to NAND chip for storing cold data, or the data stored in the NAND chip for storing cold data but accessed and become hot data as the target to be moved. A combination of the information on identification of the NAND chip 21 and the page number for identifying the physical page may be used as the identification information. In addition, the movement target information includes information indicating whether the data stored in the physical page indicated by the identification information is cold data or hot data. In the example of FIG. 6, the movement target information includes a cold data flag in which a flag is set when the movement target data is the cold data, and a hot data flag in which a flag is set when the movement target data is the hot data. The access state information and the movement target information are stored in the RAM 30 when used by the memory controller 10 and stored in the NAND memory 20 when the power of the memory system 1 is turned off.

In the data movement process, the memory controller 10 moves the data registered in the movement target information when the memory system 1 is in an idle state or when the memory system 1 is powered off or goes into a low power state. When the data is set with the cold data flag in the movement target information, the memory controller 10 reads the data from the physical page of the NAND chip as specified by the identification information in the movement target information and writes the read data to the NAND chip 21-4 for storing cold data, and invalidates the data of the source of the moved data. In addition, when the data is set with the hot data flag in the movement target information, the memory controller 10 reads the data from the physical page of the NAND chip 21-4 for storing cold data as specified by the identification information in the movement target information, and writes the read data to the NAND chip other than the NAND chip 21-4 for storing cold data and invalidates the data of the source of the moved data. By this data movement process, only the cold data is stored in the NAND chip 21-4 for storing cold data.

In the power management process, at the starting of the memory system 1, the memory controller 10 refers to the access state information, and when there is a NAND chip with no hot data, the memory controller 10 turns off a switch provided on the NAND chip with no hot data. As the data movement process is performed once or more, the NAND chip removed of the hot data becomes the NAND chip 21-4 for storing cold data. When access to the NAND chip 21-4 for storing cold data is generated after starting the memory system 1, the memory controller 10 turns on the switch provided on the NAND chip 21-4 for storing cold data.

As a result, power is not supplied to the NAND chip 21-4 in which the cold data with low read frequency is collected after starting of the memory system 1, so that the power consumption of the memory system 1 may be reduced.

Next, the process in such a memory system 1 will be described. Herein below, (1) access state management process, (2) data movement process, and (3) power management process will be described.

(1) Access State Management Process

Figure 7:
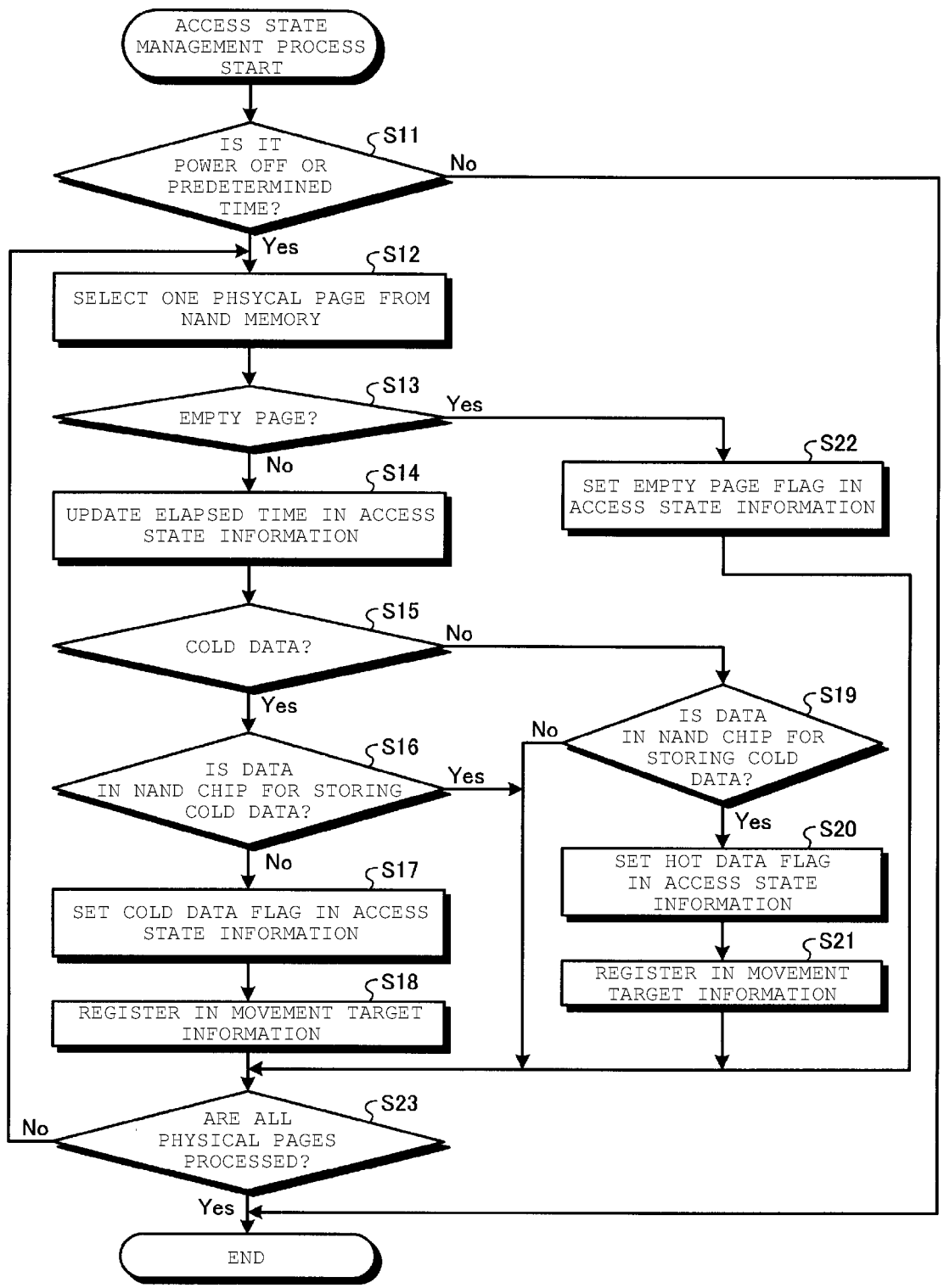
FIG. 7 is a flowchart showing an example of a procedure of access state management process in the memory system according to the first embodiment.

FIG. 7 is a flowchart showing an example of a procedure of access state management process in the memory system according to the first embodiment. The memory controller 10 determines whether a request to turn off the power is received or whether a predetermined time has come (step S11). The power of the memory system 1 is turned off in response to a request from the host 2, for example. As a situation when the power of the memory system 1 is turned off, there are cases when the power of the memory system 1 is completely turned off or when the memory system 1 is shifted to the sleep state. In addition, the predetermined time may be a predetermined date or time, or may be a date and time after a predetermined time has elapsed from the previous access state management process.

If a request to turn off the power is not received and the predetermined time has not elapsed (NO in step S11), the process is completed. If a request to turn off the power is received or the predetermined time has elapsed (YES in step S11), the memory controller 10 selects one physical page from the NAND memory 20 (step S12). The memory controller 10 determines whether the selected physical page is an empty page (step S13).

When the selected physical page is not an empty page (NO in step S13), the memory controller 10 updates the elapsed time of the corresponding record in the access state information with respect to the data stored in the physical page (step S14). In addition, the memory controller 10 determines whether the data stored in the selected physical page is cold data based on the updated elapsed time (step S15). Specifically, the memory controller 10 compares the updated elapsed time with a threshold value for determining the cold data. The memory controller 10 determines that the target data is cold data when the updated elapsed time is greater than the threshold value. Conversely, the memory controller 10 determines that the target data is hot data when the updated elapsed time is shorter than the threshold value.

When the target data is cold data (YES in step S15), the memory controller 10 further determines whether the target data is the data in the NAND chip 21-4 for storing cold data (step S16). When the target data is not the data in the NAND chip 21-4 for storing cold data (NO in step S16), then the target data is marked as a movement target data. As a result, the memory controller 10 sets a cold data flag in the corresponding record in the access state information (step S17) and registers the same in the movement target information (step S18). For example, as shown in FIG. 6, identification information including the NAND chip and page number of the physical page 27, and information indicating that the movement target data is cold data are registered in the movement target information.

In step S15, when the target data is not the cold data (NO in step S15), that is, when the target data is the hot data, the memory controller 10 further determines whether the target data is the data in the NAND chip 21-4 for storing cold data (step S19). When the target data is the data in the NAND chip 21-4 for storing cold data (YES in step S19), then the target data is marked as a movement target data. As a result, the memory controller 10 sets a hot data flag in the corresponding record in the access state information (step S20) and registers the same in the movement target information (step S21). For example, as shown in FIG. 6, identification information including the NAND chip 21 and the page numbers of the physical page 27, and information indicating that the movement target data is the hot data are registered in the movement target information.

In addition, when the physical page selected in step S13 is an empty page (YES in step S13), an empty page flag is set in the corresponding record in the access state information (step S22).

Then, after step S18, after step S21, when the target data is in the NAND chip 21-4 for storing cold data in step S16 (YES in step S16), or when the target data is not in the NAND chip 21-4 for storing cold data in step S19 (NO in step S19), the memory controller 10 determines whether all the physical pages in the NAND memory 20 are processed (step S23). When all the physical pages are not processed (NO in step S23), the process returns to step S12. When all the physical pages are processed (YES in step S23), the access state management process is completed.

(2) Data Movement Process

Figure 8:
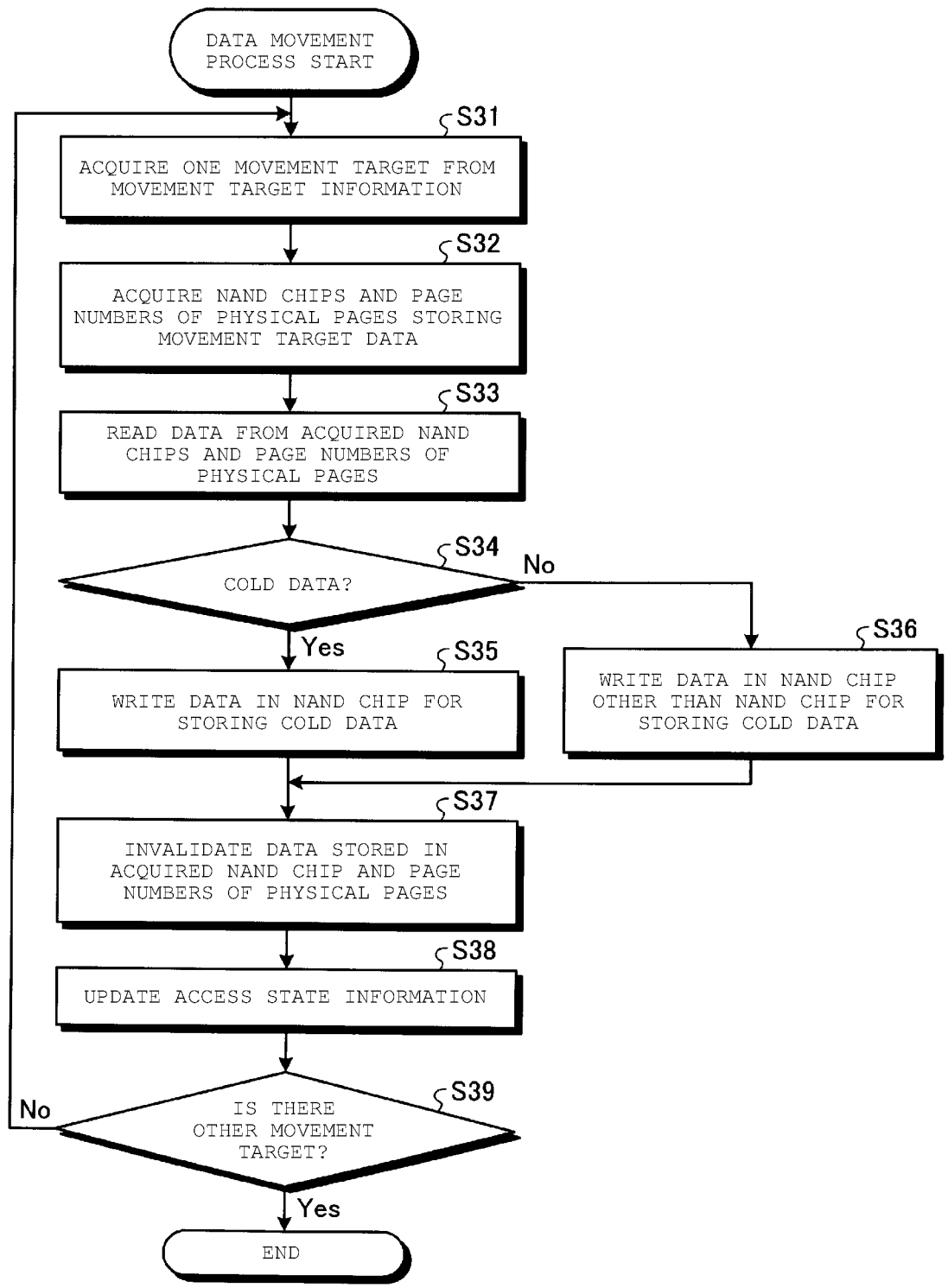
FIG. 8 is a flowchart showing an example of a procedure of data movement process in the memory system according to the first embodiment.

FIG. 8 is a flowchart showing an example of the procedure of the data movement process in the memory system according to the first embodiment. First, the data movement process is performed when a movement target is registered in the movement target information by the access state management process in FIG. 7, or any time before the power of the memory system 1 is turned off, for example. When it is the timing for the data movement process, the memory controller 10 acquires one movement target from the movement target information (step S31). Subsequently, the memory controller 10 acquires identification information in which the movement target data is stored, that is, the NAND chip 21 and the page number of the physical page 27 (step S32).

Thereafter, the memory controller 10 reads movement target data from the NAND memory 20 using the acquired NAND chip 21 and page numbers of the physical page 27 (step S33). In addition, the memory controller 10 determines whether the movement target data is the cold data based on the movement target information (step S34). When determining the cold data (YES in step S34), the memory controller 10 writes the read data in the NAND chip 21-4 for storing cold data (step S35). In addition, when determining that it is not the cold data (NO in step S34), that is, when determining hot data, the memory controller 10 writes the data in the NAND chip 21 other than the NAND chip 21-4 for storing cold data (step S36).

After that, or after step S35, the memory controller 10 invalidates the data stored in the NAND chip 21 and the page number of the physical page 27 acquired in step S33 (step S37). In addition, the memory controller 10 updates the access state information with respect to the moved data (step S38). The memory controller 10 registers the elapsed time in the record corresponding to the identification information for identifying the physical page in which the moved data is stored in the access state information. In the case of the movement of the cold data, the elapsed time is copied over from the previous record to the moved record. On the other hand, that is, in the case of movement of the hot data, the elapsed time is reset.

Next, the memory controller 10 determines whether there is another movement target in the movement target information (step S39). If there is another movement target (NO in step S39), the process returns to step S31. When there is no other movement target (YES in step S39), the data movement process is completed.

Figure 9:
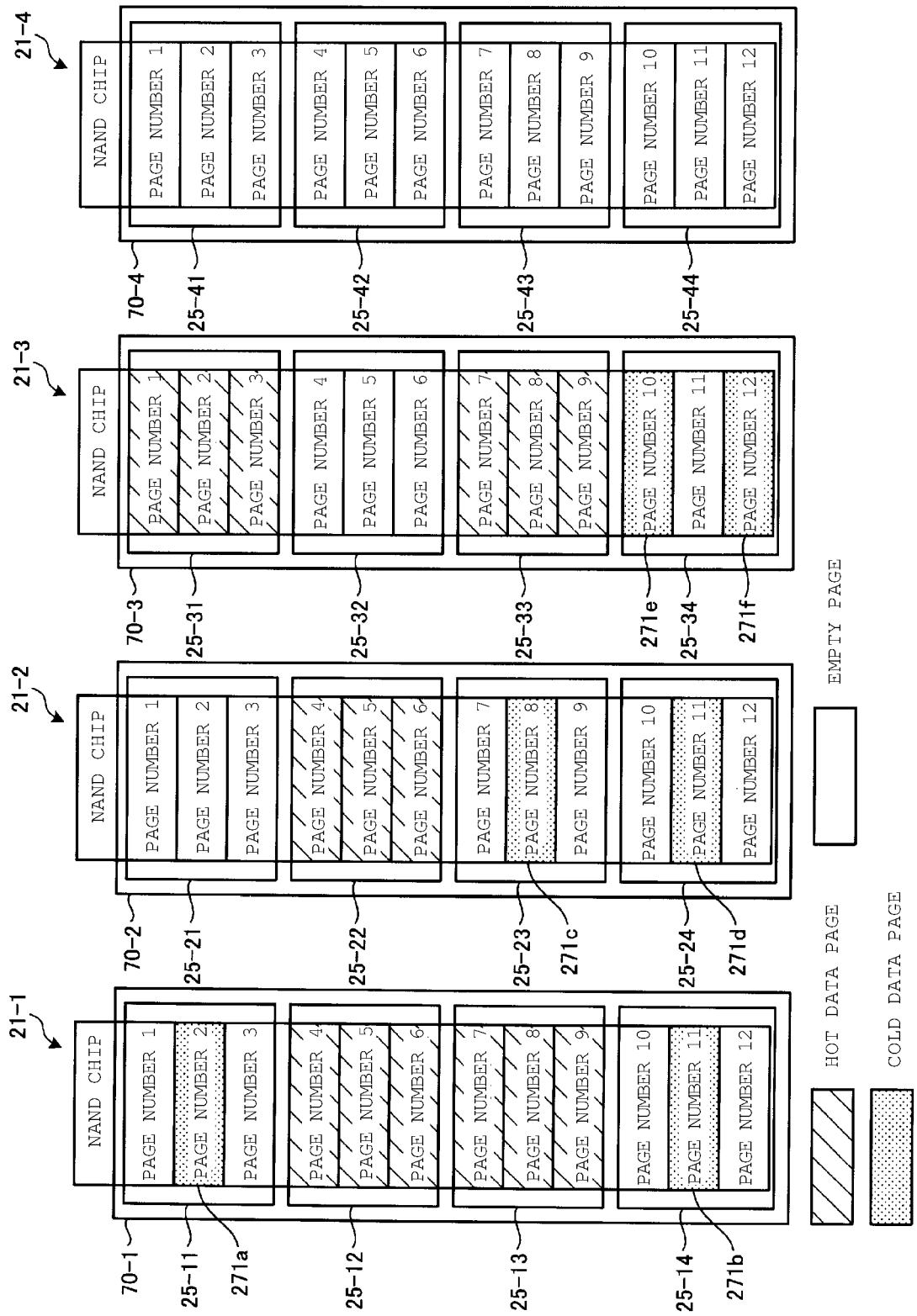
FIGS. 9 and 10 are diagrams showing an example of data movement process according to the first embodiment.
Figure 10:
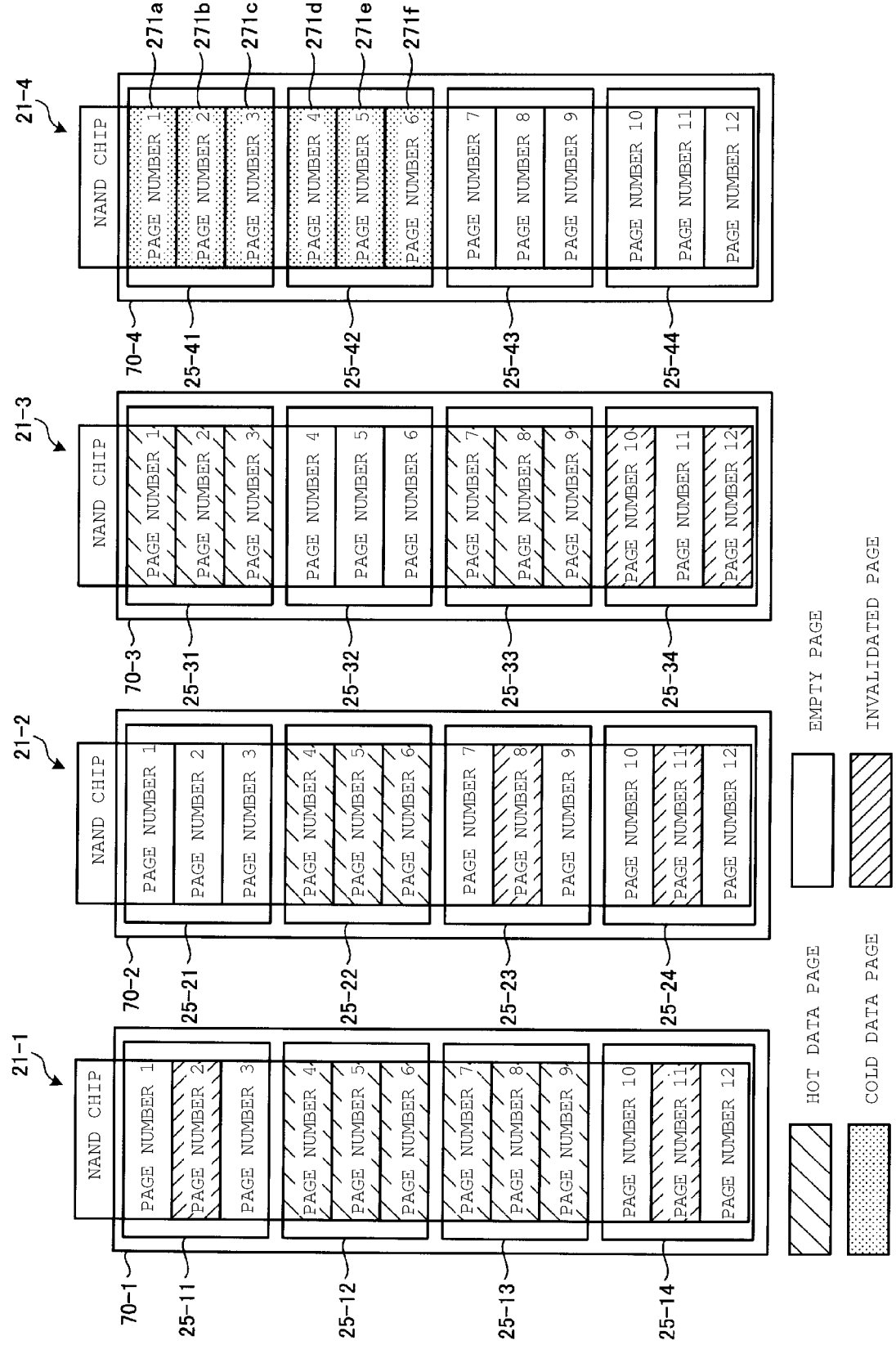

FIGS. 9 and 10 are diagrams showing an example of the data movement process according to the first embodiment. As a result of the access state management process, it is assumed that the result shown in the example of FIG. 9 is obtained. That is, all of the physical pages of the physical blocks 25-12 and 25-13 of the NAND chip 21-1, the physical block 25-22 of the NAND chip 21-2, and the physical blocks 25-31 and 25-33 of the NAND chip 21-3 are the physical pages in which hot data is stored (hereinafter also referred to as hot data pages). In addition, all of the physical pages of page numbers 2 and 11 of the NAND chip 21-1, the physical pages of page numbers 8 and 11 of the NAND chip 21-2, and the physical pages of page numbers 10 and 12 of the NAND chip 21-3 are the physical pages in which the cold data 271a to 271f is stored (hereinafter also referred to as a cold data page). The other physical pages are empty pages.

Since the NAND chip 21-4 is a NAND chip for storing cold data, the cold data 271a to 271f are moved to the NAND chip 21-4. That is, the memory controller 10 reads the data 271a from the physical page of the page number 2 of the NAND chip 21-1, writes the data 271a to the physical page of the page number 1 of the NAND chip 21-4, and then invalidates the physical page of the page number 2 of the NAND chip 21-1. Likewise, the data 271b to 271f are written to the NAND chip 21-4. Then the physical page of each source of the moved data is invalidated. The result is shown in FIG. 10. As a result, the NAND chip 21-4 includes only the cold data pages and the empty pages.

(3) Power Management Process

Figure 11:
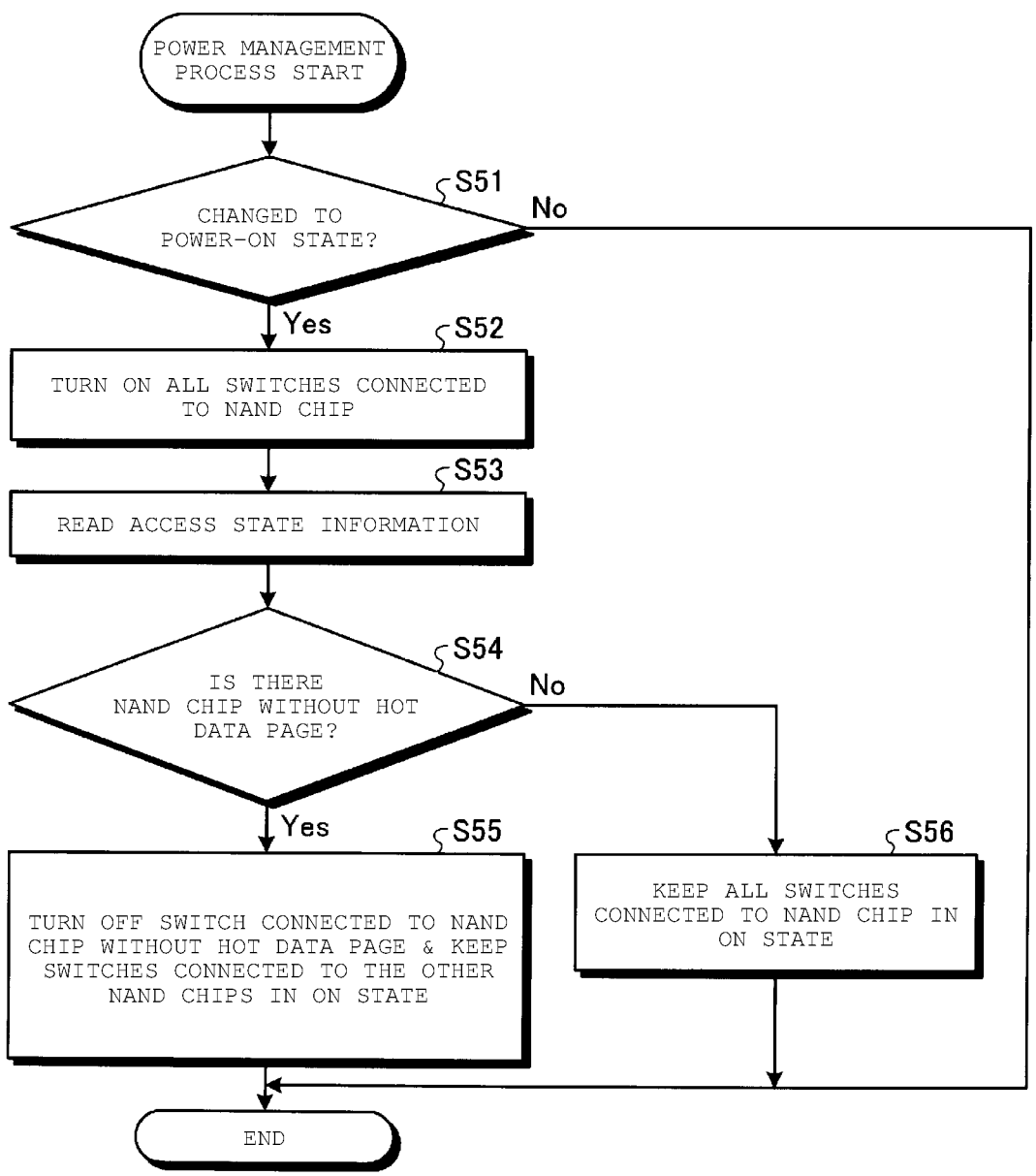
FIG. 11 is a flowchart showing an example of a procedure of power management process according to the first embodiment.

FIG. 11 is a flowchart showing an example of the procedure of the power management process according to the first embodiment. First, the memory controller 10 determines whether or not the power of the memory system 1 is switched to ON state (step S51). When the power of the memory system 1 is not switched to the ON state (NO in step S51), the process is completed. In addition, when the power of the memory system 1 is switched to the ON state (YES in step S51), the memory controller 10 turns on the switches 52-1 to 52-4 connected to all the NAND chips 21-1 to 21-4 (step S52).

Subsequently, the memory controller 10 reads the access state information from the NAND memory 20 onto the RAM 30 (step S53). The memory controller 10 refers to the access state information and determines whether there is a NAND chip 21 with no hot data page (step S54). Since the access state information of FIG. 5 includes a hot data flag, the memory controller 10 determines whether there is a NAND chip 21 for which the hot data flag is not set. In addition, for the access state information not including the hot data flag, the elapsed time and the threshold value are compared for each record in the access state information to determine whether or not the page is a hot data page, and as a result, it is determined whether there is a NAND chip 21 with no hot data page.

When there is a NAND chip 21 with no hot data page (YES in step S54), the memory controller 10 turns off the switch 52 connected to the NAND chip 21 with no hot data page and keeps the switch 52 connected to the other NAND chip 21 in ON state (step S55). On the other hand, when there is no NAND chip 21 with no hot data page (NO in step S54), the memory controller 10 keeps the switches 52 connected to all the NAND chips 21 in ON state (step S56). After that, or after step S55, the power management process is completed.

Figure 12:
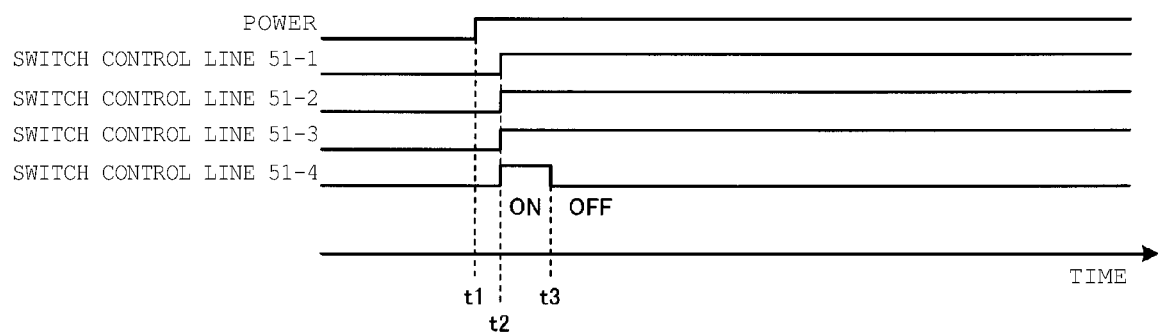
FIG. 12 is a timing chart showing how the switches of the NAND chip are controlled when power is supplied to the memory system according to the first embodiment.

FIG. 12 is a timing chart showing how the switches of the NAND chip are controlled when power is supplied to the memory system according to the first embodiment. In FIG. 12, the horizontal axis represents time. The power of the memory system 1 is turned on at time t1, and the memory controller 10 turns on the switches 52-1 to 52-4 through the switch control lines 51-1 to 51-4 at time t2. Thereafter, the memory controller 10 completes referencing to the access state information, and turns off the switch 52-4 connected to the NAND chip 21-4 with no hot data page through the switch control line 51-4 at time t3. As a result, the NAND chip 21-4 with no hot data page is then turned off. When there is subsequent access to the NAND chip 21-4 with no hot data page, the power is supplied to the NAND chip 21-4 (not shown in FIG. 12).

In the first embodiment, the NAND chips 21-1 to 21-4 include switches 52-1 to 52-4 for switching on and off the power, and the logical blocks 70-1 to 70-4 are configured using the physical blocks 25 in one of NAND chips 21-1 to 21-4. The elapsed time from a last access to the physical page of each of the NAND chips 21-1 to 21-4 is managed as the access state information, and the data of which elapsed time exceeds the threshold value is registered as the cold data in the movement target information. At a predetermined timing, the cold data registered in the movement target information is collected and stored in the NAND chip 21-4 for storing cold data. Then, when the power of the memory system 1 is turned on, the memory controller 10 refers to the access state information, and turns off the switch 52 connected to the NAND chip 21 when there is a NAND chip 21 with no hot data page so that the supply of power to the NAND chip 21 is stopped. As a result, compared with the situation where all the NAND chips 21 are always ON, the time is saved by keeping the power consumption of one NAND chip 21 OFF. As a result, it is possible to reduce power consumption as compared with the related art.

Second Embodiment

In the first embodiment, the power of the NAND chip with no hot data page is turned off. While the possibility of an access request to the NAND chip with no hot data page is considered to be very low, the possibility that the access request is generated is not zero. In the first embodiment, since the switch is turned on after receiving the access request to the NAND chip with no hot data page, a delay occurs until the access is actually performed.

In the second embodiment, during the power management process, the memory controller 10 controls the switch 52-4 of the NAND chip with no hot data page to be turned on and off repeatedly at a predetermined timing. The manner of storing data in the NAND chip 21 is the same as described in the first embodiment.

Figure 13:
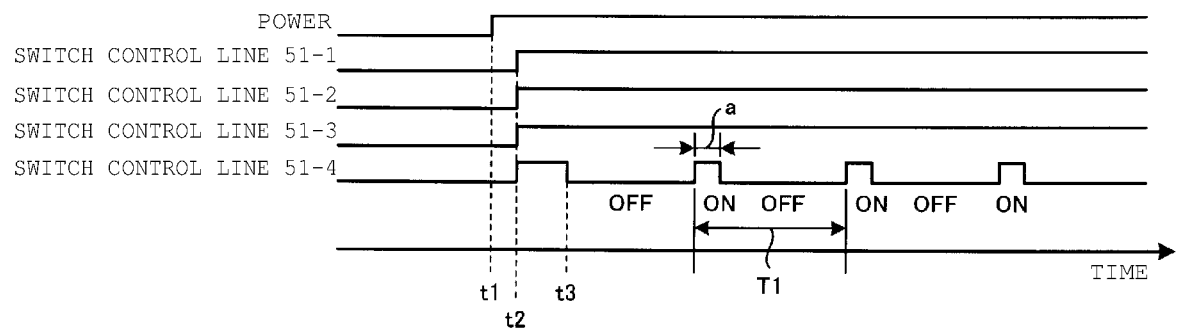
FIG. 13 is a timing chart showing how the switches of the NAND chip are controlled when power is supplied to the memory system according to a second embodiment.

FIG. 13 is a timing chart showing how the switches of the NAND chip are controlled when power is supplied to the memory system according to the second embodiment. In FIG. 12, the horizontal axis represents time. The process until time t3 is the same as in FIG. 12. Thereafter, the memory controller 10 turns on the switch 52-4 only for a period of time a through the switch control line 51-4 at a predetermined cycle T1. The period of time a, during which the switch 52-4 is turned on in the predetermined cycle T1, is hereinafter referred to as ON duty. The memory controller 10 repeatedly switches on and off the switch 52-4. As a result, when an access request to the NAND chip 21-4 with no hot data page is received while the switch 52-4 is ON, the access request may be processed without delay. In addition, while an access request is received at either the period of time during which the switch 52-4 is ON or the period of time during which the switch 52-4 is OFF, overall, it is possible to reduce the delay from when the access request is received until it is actually accessed as compared with the case of the first embodiment.

In the second embodiment, when the power of the memory system 1 is turned on, after turning off the switch 52-4 connected to the NAND chip 21-4 with no hot data page, the memory controller 10 controls the switch 52-4 to repeatedly turn on and off the power at a predetermined cycle. As a result, while an access request to the NAND chip 21-4 with no hot data page can be received when the power is ON or when the power is OFF, an average time from when the access request is received until it is actually accessed can be shortened as compared with the case of the first embodiment.

Third Embodiment

In the first and second embodiments, the cold data for which elapsed time from the last access exceeds the threshold value is collected and stored in one NAND chip among a plurality of NAND chips. That is, data is determined to be cold data or not by using one threshold value. In a third embodiment, a case where the threshold value is subdivided into two or more threshold values will be described, in which the elapsed time from the last access is divided based on the threshold values, and the NAND chip as the destination of storage is varied according to the length of the elapsed time of the cold data. The memory system according to the third embodiment also has a configuration similar to that described in the first embodiment.

Figure 14:
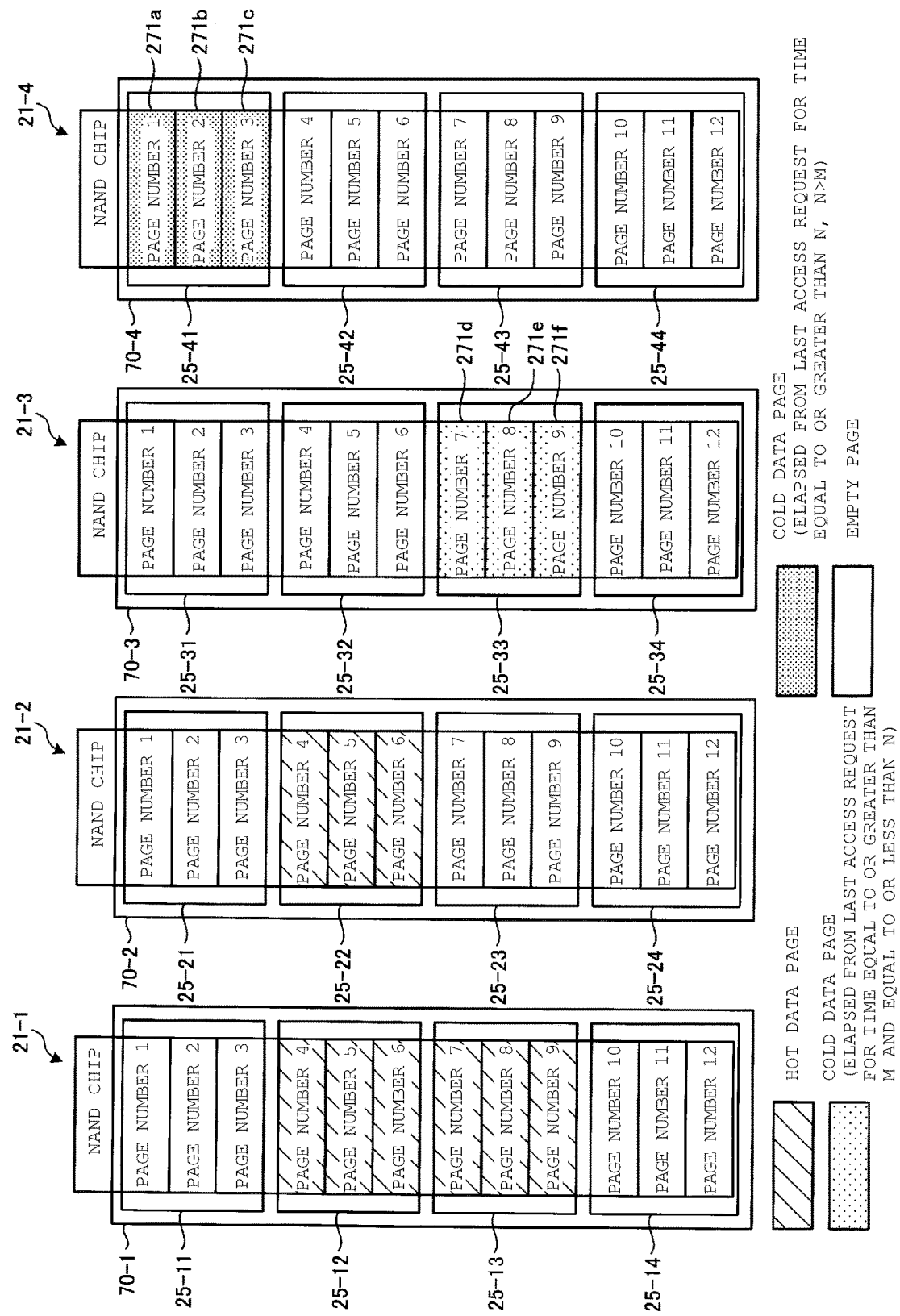
FIG. 14 is a diagram schematically showing an example of data movement process according to a third embodiment.

In the third embodiment, the memory controller 10 classifies the cold data using two threshold values M and N (M<N). FIG. 14 is a diagram schematically showing an example of a data movement process according to the third embodiment. During the data movement process, the memory controller 10 collects the cold data 271a to 271c when the elapsed time from the last access is equal to or greater than N in the NAND chip 21-4 and collects the cold data 271d to 271f when the elapsed time from the last access is equal to or greater than M but less than N, the NAND chip 21-3. Hot data is stored in the NAND chips 21-1 and 21-2. That is, in the third embodiment, the NAND chips 21-3 and 21-4 are NAND chips for storing cold data.

Figure 15:
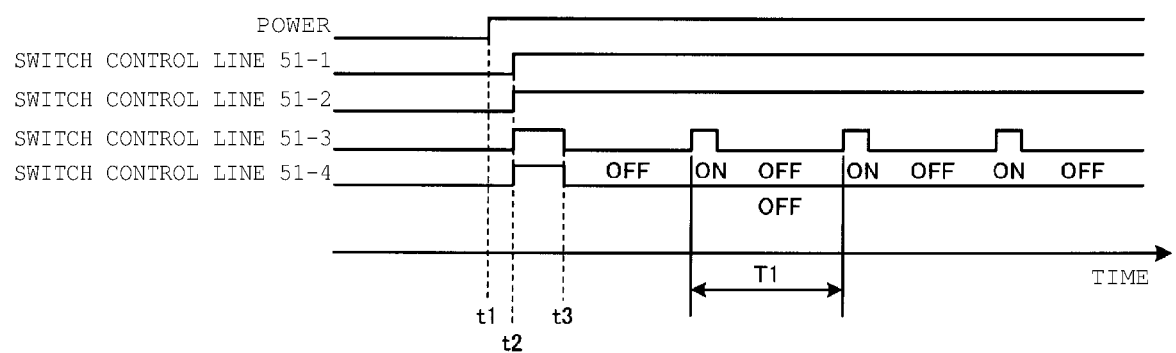
FIG. 15 is a timing chart showing how the switches of the NAND chip are controlled when power is supplied to the memory system according to the third embodiment.

Further, for power management process, the memory controller 10 can change the control of the switches 52-1 to 52-4 according to the types of the cold data. FIG. 15 is a timing chart showing how the switches of the NAND chip are controlled when power is supplied to the memory system according to the third embodiment. In FIG. 12, the horizontal axis represents time. The process until time t3 is the same as in FIG. 12. It is considered that the probability of accessing cold data stored in the NAND chip 21-3 is higher than accessing cold data stored in the NAND chip 21-4. Therefore, for the NAND chip 21-4, the memory controller 10 keeps the switch 52-4 OFF through the switch control line 51-4 connected to the NAND chip 21-4 after time t3, as described in the first embodiment until there is a subsequent access. On the other hand, for the NAND chip 21-3, the memory controller 10 turns on the switch 52-3 only for a predetermined period of time through the switch control line 51-3 at the predetermined cycle T1 after the time t3, as the switch control line 51-4 was controlled in the second embodiment.

In this way, by repeating ON and OFF at a predetermined cycle the supply of power to the NAND chip 21-3, which is more likely to receive an access request, the delay at the time of receiving the access request is reduced as compared with the NAND chip 21-4 which is less likely to receive an access request.

In addition, in this example, the case of subdividing the cold data into two types has been described, but the cold data may be subdivided into three or more types of data. In this case, the ON duty at the predetermined cycle T1 is preferably lengthened for the NAND chip 21 storing the cold data for which elapsed time from the last access is relatively shorter than the others.

In the third embodiment, the NAND chip 21 for storing cold data is divided according to the length of the elapsed time from the last access. In addition, the cold data having a shorter elapsed time from the last access is set to have an increased ON duty upon power on at the predetermined cycle T1 during power off. Thereby, for cold data which is more likely to receive an access request, there is an advantage that the latency at the time of receiving the access request can be shortened and the power consumption of the entire memory system 1 can be reduced.

Fourth Embodiment

Figure 16:
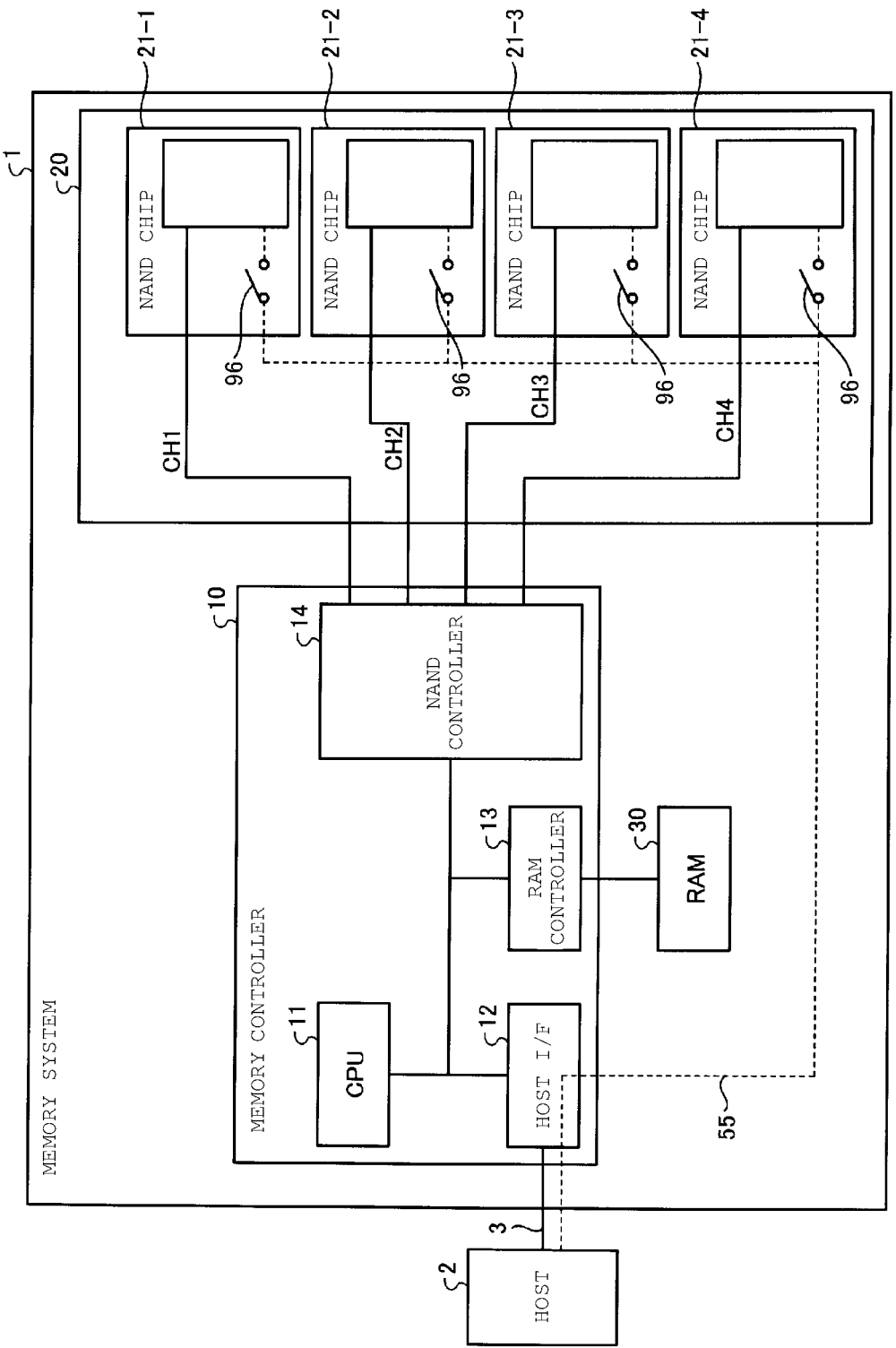
FIG. 16 is a diagram showing an example of the configuration of the memory system according to the fourth embodiment.

FIG. 16 is a diagram showing an example of the configuration of the memory system according to a fourth embodiment. The memory system 1 has the same configuration as that of the first embodiment shown in FIG. 1, except that the switches 52-1 to 52-4 are provided in the NAND chips 21-1 to 21-4, respectively. The control of the switches 52-1 to 52-4 by the memory controller 10 is the same as that described in the first to third embodiments. The same reference numerals are given to the same components as those of the first embodiment shown in FIG. 1, and the explanation thereof will not be repeated.

In FIG. 16, the power supply to the NAND chips 21-1 to 21-4 is controlled by the memory controller 10, while the power supply to the NAND chips 21-1 to 21-4 may be controlled by a switch without involving the memory controller 10.

Figure 17:
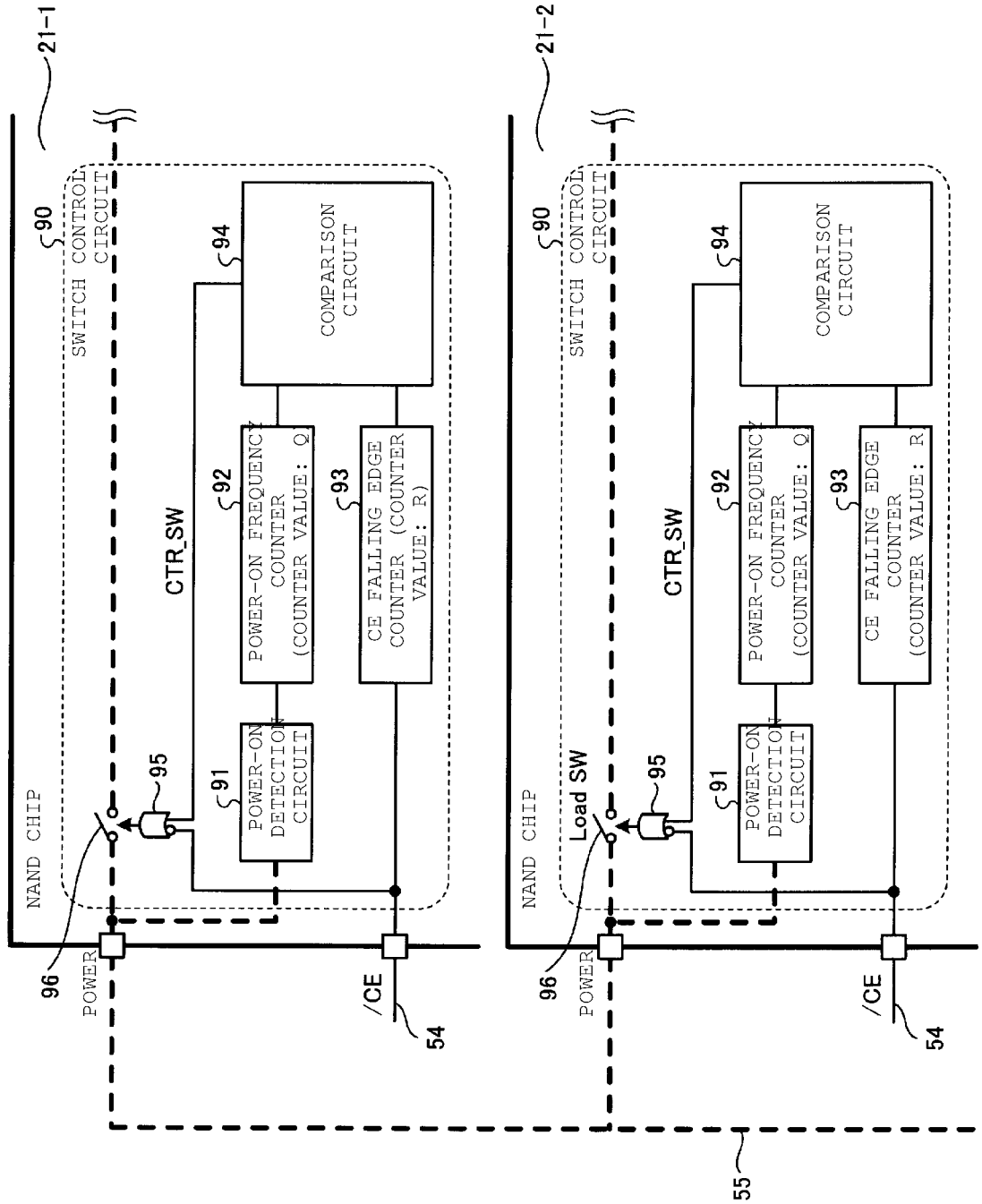
FIG. 17 is a block diagram schematically showing an example of a configuration of a switch control circuit in a NAND chip according to a fourth embodiment.

FIG. 17 is a block diagram schematically showing an example of a configuration of a switch control circuit in the NAND chip according to the fourth embodiment. The switch control circuit 90 includes a power-on detection circuit 91, a power-on frequency counter 92, a chip enable signal falling edge counter (hereinafter referred to as a CE falling edge counter) 93, a comparison circuit 94, an OR gate circuit 95, and a switch 96.

The power-on detection circuit 91 is connected to a power line 55 supplied to the NAND chip 21 and operates to detect the power supply to the NAND chip 21. Upon detection of power-on, the power-on detection circuit 91 outputs a power-on detection signal to the power-on frequency counter 92.

The power-on frequency counter 92 increases its count value Q by one each time the power-on frequency counter 92 receives the power-on detection signal from the power-on detection circuit 91. When each NAND chip 21 detects a falling edge of the chip enable signal from the memory controller 10, the CE falling edge counter 93 increments its count value R by one. The falling edge of the chip enable signal indicates that the NAND chip 21 can be switched to a state in which it can receive a command.

The comparison circuit 94 compares the count value of the power-on frequency counter 92 with the count value of the CE falling edge counter 93, and outputs a switch control signal CTR_SW instructing the control of the switch 96 according to the comparison result. FIG. 18 is a diagram showing an example of power control by comparing the frequency of power-on and the frequency of falling edges of the chip enable signal. Here, the frequency of power-on is Q, and the frequency of falling edges of the chip enable signal is R.

When Q>R, the frequency of the chip enable signal falling edge R is smaller than the frequency of power-on Q and the frequency of access is small. Therefore, in this case, the power control is performed to turn off until the access request is received from the host 2.

When Q=R, the frequency of the chip enable signal falling edges R is equal to the frequency of power-on Q, and in this case, the access frequency is also small. However, the access frequency is greater than when Q>R. Therefore, in this case, power is controlled to be turned off until an access request is received from the host 2, or power is controlled to be turned on at low frequency.

When Q<R, the frequency of the chip enable signal falling edge R is greater than the frequency of power-on 4, that is, it is the normal access frequency. Therefore, in this case, power is controlled to be turned on at medium frequency or to be turned on at high frequency. In this case, the medium frequency and the high frequency are divided according to the value of R−Q. For example, when the value of R−Q is 0 or more, but less than A, power is turned on at medium frequency, and when the value of R−Q is not less than A, power is turned on at high frequency.

Here, the low frequency, the medium frequency, and the high frequency are achieved by changing the ON duty a of switching on and off in FIG. 13, for example. That is, with respect to the length of the predetermined cycle T1, the frequency is lower as the ON duty a is shorter, and the frequency is higher as the ON duty a is longer. In a case where R-Q is very high, it is possible to always keep the NAND chip powered on.

FIG. 19 is a diagram showing an example of power control that is set in the comparison circuit. In this example, four power controls may be provided by comparing the frequencies. When the frequency of the chip enable signal falling edge R is smaller than the frequency of power-on Q (when Q>R), a switch control signal CTR_SW for controlling the power to turn off until the access request is received from the host 2 is output. When the frequency of the chip enable signal falling edge R is equal to the frequency of power-on Q (when Q=R), a switch control signal CTR_SW for controlling the power to turn on at low frequency is output. When the frequency of the chip enable signal falling edge R is greater than the frequency of power-on Q, and R−Q is greater than 0 and less than A (0<R−Q<A), a switch control signal CTR_SW for controlling the power to turn on at medium frequency is output, and when R−Q is greater than A (R−Q>A), a switch control signal CTR_SW for controlling the power to turn on at high frequency is output.

The OR gate circuit 95 is a circuit for controlling the switch 96 using the input from the chip enable signal line and the input from the comparison circuit 94 (switch control signal CTR_SW). Upon detecting the falling edge of the chip enable signal, the OR gate circuit 95 turns on the switch 96 regardless of the switch control signal CTR_SW from the comparison circuit 94. On the other hand, when the falling edge of the chip enable signal is not detected, the OR gate circuit 95 controls to turn on and off the switch 96 according to the switch control signal CTR_SW from the comparison circuit 94.

The switch 96 is provided on the power line 55 connected to the NAND chip 21. The switch 96 switches on and off the power to the NAND chip 21 according to the output of the OR gate circuit 95.

FIG. 20 is a timing chart showing an example of processing by the switch control circuit. Here, FIG. 20 shows, with respect to time, the presence or absence of the power supply to the power line, the power-on detection signal outputted from the power-on detection circuit 91, the count value of the power-on frequency counter 92, the chip enable signal (/CE), the count value of the CE falling edge counter 93, and a change in the switch control signal CTR_SW output from the comparison circuit 94.

At time t11, the count value of the power-on frequency counter 92 is q−1 counts, and the count value of the CE falling edge counter 93 is r−2 counts. When the power is turned on at time t11, the power-on detection circuit 91 outputs a pulse-like power-on detection signal at time t12, indicating that the power is turned on. Upon detecting the power-on detection signal from the power-on detection circuit 91, the power-on frequency counter 92 increases the count value by one. As a result, the count value of the power-on frequency counter 92 becomes Q.

Thereafter, the falling edge of the chip enable signal at time t13 is detected by the CE falling edge counter 93, and the frequency of falling edges of the chip enable signal is r−1. The frequency of power-on q and the frequency of the chip enable signal falling edge r−1 are input to the comparison circuit 94, and the difference between the frequency of the chip enable signal falling edge r−1 and the frequency of power-on q is calculated. Here, it is assumed that q r−1. In this case, as shown in FIG. 19, since power is turned off until an access request is received from the host 2, the comparison circuit 94 outputs a switch control signal CTR_SW for turning off the switch 96.

Thereafter, at time t14, the falling edge of the chip enable signal is detected again by the CE falling edge counter 93, and the frequency of falling edges of the chip enable signal is r. The frequency of power-on q and the frequency of the chip enable signal falling edge r are input to the comparison circuit 94, and the difference between the frequency of the chip enable signal falling edge r and the frequency of power-on q is calculated. Here, when r−q≥0, a switch control signal CTR_SW corresponding to the value of r−q is output at time t15. In this case, as shown in FIG. 19, for example, when r−q is 0, the comparison circuit 94 outputs a switch control signal CTR_SW for turning on at low frequency. In addition, for example, when 0<r−q<A, the comparison circuit 94 outputs the switch control signal CTR_SW for turning on at medium frequency. Alternatively, for example, when r−q≥A, the comparison circuit 94 outputs a switch control signal CTR_SW for turning on at high frequency. In this manner, the switch control circuit 90 switches on and off of the switch 96 based on the predetermined switch control signal CTR_SW according to the value of r−q.

According to the fourth embodiment, the same effects as those of the first to third embodiments can be obtained. In addition, in the fourth embodiment, the frequency of power-on and the frequency of falling edges of the chip enable signal are compared, and the switch 96 is switched on and off depending on the comparison result. As a result, the supply of power to the NAND chips 21-1 to 21-4 can be controlled without involving the memory controller 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a non-volatile memory that includes a plurality of memory chips;
    a plurality of switches provided for each of the memory chips for switching on and off supply of power for performing an access operation on the corresponding memory chip; and
    a memory controller that controls data access to the non-volatile memory, wherein the memory controller is configured to designate data stored in the memory chips as cold data when an elapsed time from a most recent access of the data is determined to be greater than a threshold value, and move the cold data to a first memory chip of the plurality of memory chips from other memory chips of the plurality of memory chips, wherein
    the switches are controlled to selectively switch on and off the power for performing the access operation on the plurality of memory chips,
    wherein each of the memory chips comprises one of the switches, and each of the memory chips comprises a switch control circuit configured to control the switch included therein by comparing a frequency of a power-on signal and a frequency of a chip enable signal.

2. The memory system according to claim 1, wherein
    for each of the memory chips, if the frequency of the power-on signal is greater than the frequency of the chip enable signal, the switch control circuit controls the switch inside the memory chip to turn off the supply of power for performing the access operation on the memory chip.

3. The memory system according to claim 2, wherein
    for each of the memory chips, if the frequency of the power-on signal is less than the frequency of the chip enable signal, the switch control circuit controls the switch inside the memory chip to repeat a process of turning on the supply of power for performing the access operation on the memory chip for a predetermined period of time and then turning off the supply of power according to a predetermined cycle.

4. A memory system comprising:
a non-volatile memory that includes a plurality of memory chips;
a plurality of switches provided for each of the memory chips for switching on and off supply of power to the corresponding memory chip; and
a memory controller configured to control the switches and data access to the non-volatile memory, wherein the memory controller is further configured to:
determine whether there is a first memory chip among the plurality of memory chips that has no data item stored therein with an elapsed time from a most recent access thereof that is less than a threshold value; and
if so, repeat a process of turning on the power to the first memory chip for a predetermined period of time and then turning off the power to the first memory chip at a predetermined cycle, and also repeat a process of turning on the power to a second memory chip of the plurality of memory chips for the predetermined period of time and then turning off the power to the second memory chip at a cycle that is shorter than the predetermined cycle.

5. The memory system according to claim 4, wherein the memory controller determines whether there is the first memory chip among the plurality of memory chips by referring to access state information indicating the elapsed time from the most recent access for each data item of a unit size stored in each of the plurality of memory chips.

6. The memory system according to claim 5, wherein the memory controller compares the elapsed time in the access state information with the threshold value for each data item of the unit size stored in each of the plurality of memory chips to designate the data item as hot data if the elapsed time does not exceed the threshold value or as cold data if the elapsed time exceeds the threshold value.

7. The memory system according to claim 6, wherein the memory controller is configured to designate one of the memory chips as a second memory chip for storing cold data items, and to move hot data items from the second memory chip to another of the memory chips and move cold data items from another of the memory chips to the second memory chip.

8. The memory system according to claim 7, wherein after the move, the memory controller updates the access state information to indicate that the cold data item moved to the second memory chip has the same elapsed time as before the move.

9. The memory system according to claim 7, wherein after the move, the memory controller updates the access state information to indicate that the hot data items moved from the second memory chip have an elapsed time of zero.

10. The memory system according to claim 4, wherein the controller is configured to manage each of multiple sets of a plurality of physical blocks as a unit of data erase in the non-volatile memory, and
each of the multiple sets, which represents a logical block, contains physical blocks of only a single memory chip.

11. The memory system according to claim 4, wherein the switches are provided outside the memory chips.

* * * * *